United States Patent
Wu

(10) Patent No.: US 8,209,546 B2
(45) Date of Patent: Jun. 26, 2012

(54) DATA-SECURING METHOD OF PROGRAM TOOL

(75) Inventor: Tsung-Hsien Wu, Taipei (TW)

(73) Assignee: Via Technologies, Inc., Taipei (TW)

( * ) Notice: Subject to any disclaimer, the term of this patent is extended or adjusted under 35 U.S.C. 154(b) by 929 days.

(21) Appl. No.: 11/937,900

(22) Filed: Nov. 9, 2007

(65) Prior Publication Data

US 2008/0152129 A1  Jun. 26, 2008

(30) Foreign Application Priority Data

Dec. 25, 2006  (TW) ................ 95148822 A

(51) Int. Cl.
| H04L 29/06 | (2006.01) |
| H04L 9/32 | (2006.01) |
| H04L 9/00 | (2006.01) |
| H04L 9/08 | (2006.01) |
| H04K 1/00 | (2006.01) |
| G06F 11/30 | (2006.01) |
| G06F 9/44 | (2006.01) |
| G06F 21/00 | (2006.01) |
| G06F 15/78 | (2006.01) |
| H04L 9/06 | (2006.01) |

(52) U.S. Cl. ........ 713/190; 713/155; 713/167; 713/171; 713/189; 717/100; 380/28; 380/45; 380/278

(58) Field of Classification Search ............... 713/190, 713/189, 167, 155, 171; 705/64; 717/100; 380/278, 28, 45

See application file for complete search history.

(56) References Cited

U.S. PATENT DOCUMENTS

| 2005/0160050 | A1 | 7/2005 | Payne | |
| 2006/0059369 | A1* | 3/2006 | Fayad et al. | 713/189 |
| 2008/0244506 | A1* | 10/2008 | Killian et al. | 717/100 |
| 2010/0100724 | A1* | 4/2010 | Kaliski, Jr. | 713/155 |

FOREIGN PATENT DOCUMENTS

| CN | 1992036 A | 7/2007 |
| JP | 2007102431 | 4/2007 |
| TW | 200625167 | 7/2006 |
| WO | WO 2009140707 A1 * | 11/2009 |

OTHER PUBLICATIONS

Lim, D.; Neely, C.E.; Zuver, C.K.; Lockwood, J.W.; "Internet-based tool for system-on-chip integration"; Microelectronic Systems Education, 2003. Proceedings. 2003 IEEE International Conference on Digital Object Identifier: 10.1109/MSE.2003.1205281; Publication Year: Mar. 2003 , pp. 117-118.*

Lee, Yann-Chyau, "Design and Implementation of a High-Performance Triple DES Encryption/Decryption Chip", Jul. 2002.

* cited by examiner

*Primary Examiner* — Eleni Shiferaw
*Assistant Examiner* — Courtney Fields
(74) *Attorney, Agent, or Firm* — Kirton McConkie; Evan R. Witt

(57) ABSTRACT

A program tool with a data-securing function includes a flow control center and a plurality of processing units for performing respective processing steps. The flow control center receives and transfers an encrypted input data to perform a decryption step, transfers the decrypted data to one of the plurality of processing units to perform a corresponding processing step, and further transfers the processed data to perform an encryption step.

13 Claims, 4 Drawing Sheets ically with the diagram of FIG. 2. In the first processing step 21, a
DATA-SECURING METHOD OF PROGRAM TOOL

FIELD OF THE INVENTION

The present invention relates to a data-securing method, and more particularly to a data-securing method for use in a program tool.

BACKGROUND OF THE INVENTION

Most electronic products are composed of circuit modules. With the increasing specialization in designing and manufacturing, the circuit modules contained in a single electronic product may be designed or manufactured by different companies. For example, a cell phone generally includes a plurality of circuit blocks, e.g. an RF/IF (radio frequency/intermediate frequency) module 11, a baseband/control module 12, a memory module 13, an input key module 14, an audio module 15 and a display module 16, as shown in FIG. 1. For manufacturing such a cell phone, the maker purchases necessary parts and devices from various suppliers, and properly combines these parts and devices to assemble the cell phone. Among the devices, the baseband/control module 12 includes a core device, e.g. an SOC (system on chip) 120, which is generally purchased from an IC design company and further modified by the cell phone company. The cell phone maker may design its own cell phones by writing mid-level or high-level program codes into the SOC 120 for modification.

For the purpose of readily modifying the SOC 120, the SOC supplier may provide a program tool for the use of the cell phone maker. A conventional program tool is illustrated with the diagram of FIG. 2. In the first processing step 21, a first input data 210 is inputted and processed into a first output data 211. The first output data 211 is then inputted and processed in a second processing step 22 independently or along with a second input data 220 to generate a second output data 221, which is further inputted into a third processing step 23. The second output data 221 and/or a third input data 230 are processed in the third processing step 23 to generate a third output data 231, which are final program codes for SOC control and stored into a memory 25. The nodes 201, 202 and 203 shown in the diagram indicate several portal sites where the cell phone maker is allowed to arbitrarily check or edit the program codes of the program tool.

In other words, via the nodes 201, 202 and 203, partial contents of the program tool, e.g. the first output data 211, the second out data 221 and the third output data 231, are visible to the users of the program tool, which is undesired by the SOC designer. For example, the contents may disclose the details of the instruction set when the SOC is a RISC (reduced instruction set computer) with a DSP (digital signal processor) function.

SUMMARY OF THE INVENTION

Therefore, the present invention provides a data-securing method for use in a program tool, which properly encrypts and decrypts intermediate output data so as to hide specific data from arbitrary accessing and revising of the program tool.

A data-securing method for use in a program tool includes steps of: performing a first processing step with a first input data to generate a first output data; transferring the first output data by a flow control center to perform an encryption step of the first output data to generate an encrypted first output data; transferring the encrypted first output data by the flow control center to perform a decryption step of the encrypted first output data to recover the first output data; and performing a second processing step with the recovered first output data to generate a second output data.

Another data-securing method for use in a program tool includes steps of: performing a first processing step with a first input data to generate a first output data; transferring the first output data by a flow control center to perform an encryption step of the first output data to generate an encrypted first output data; storing the encrypted first output data; transferring the stored encrypted first output data by the flow control center to perform a decryption step of the encrypted first output data when the first output data is to be used as an input data of a second processing step, thereby recovering the first output data; and performing the second processing step with the recovered first output data to generate a second output data.

A program tool with a data-securing function, comprising a flow control center and a plurality of processing units for performing respective processing steps, wherein the flow control center receives and transfers an encrypted input data to perform a decryption step, transfers the decrypted data to one of the plurality of processing units to perform a corresponding processing step, and further transfers the processed data to perform an encryption step.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Conventionally, data encryption is performed only for the final output data. In other words, for the intermediate output data which are generated during the execution of a program tool and at the risk of undesired disclosure, there is no encryption mechanism provided. A data-securing method provided according to the present invention is able to solve this problem. Take the program tool of FIG. 2 for example. The program tool is for developing a control chip. The intermediate output data 211, 221 and 231 are encrypted before they can be accessed, and then decrypted before they are inputted to next processing steps.

Figure 1:
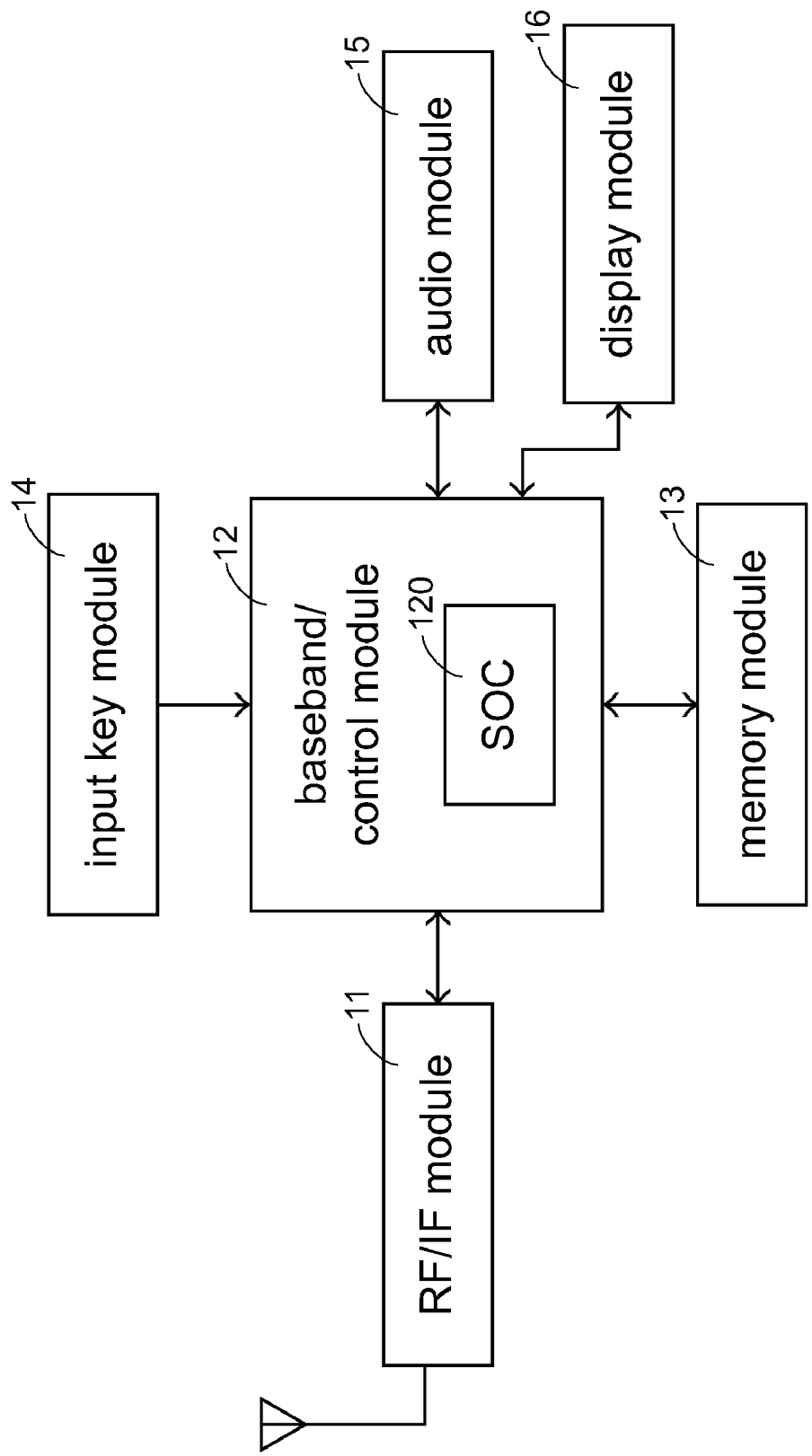
FIG. 1 is a block diagram schematically showing circuit modules included in a typical cell phone.
Figure 2:
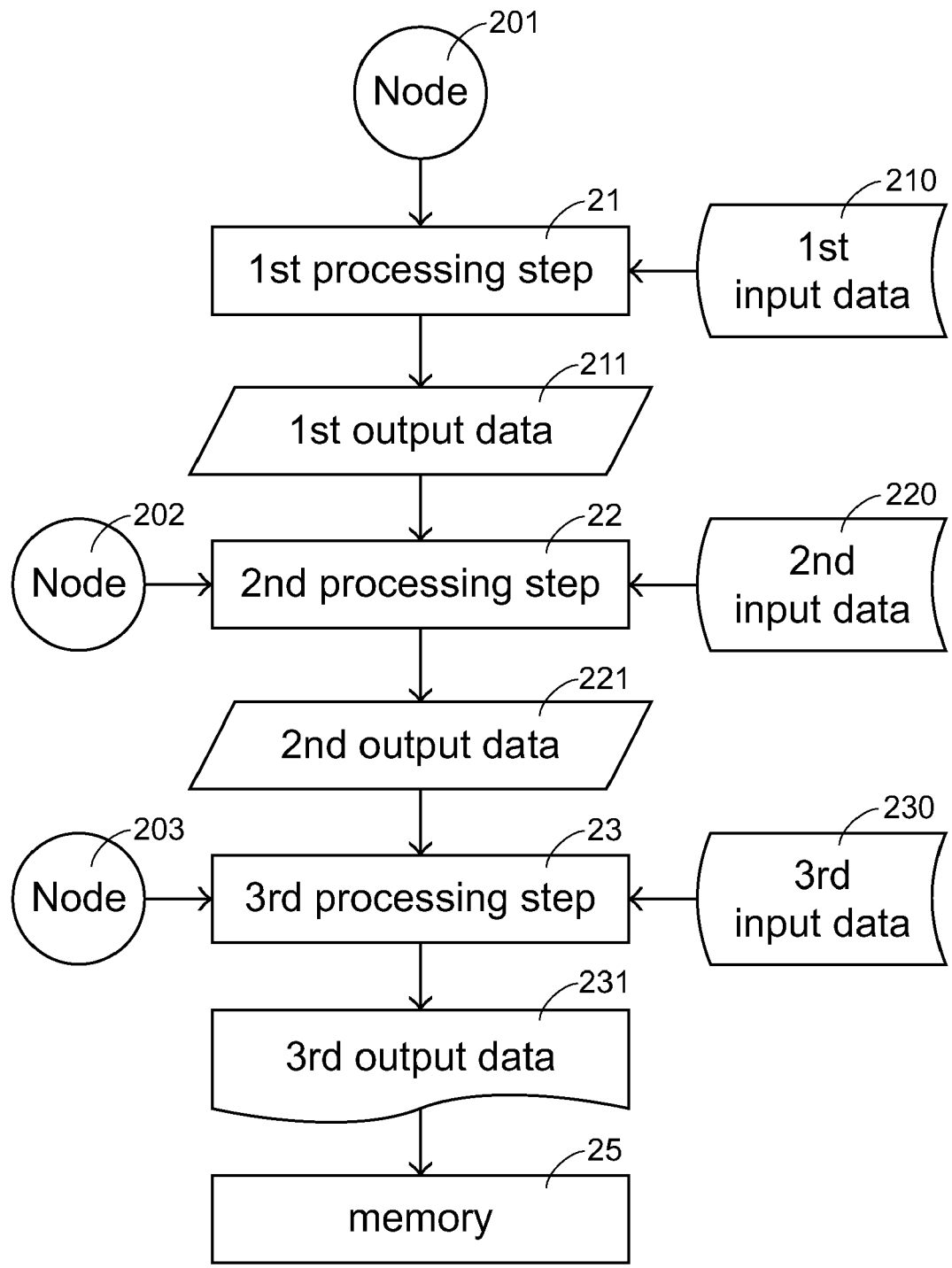
FIG. 2 is scheme showing a data flow in a program tool.
Figure 3:
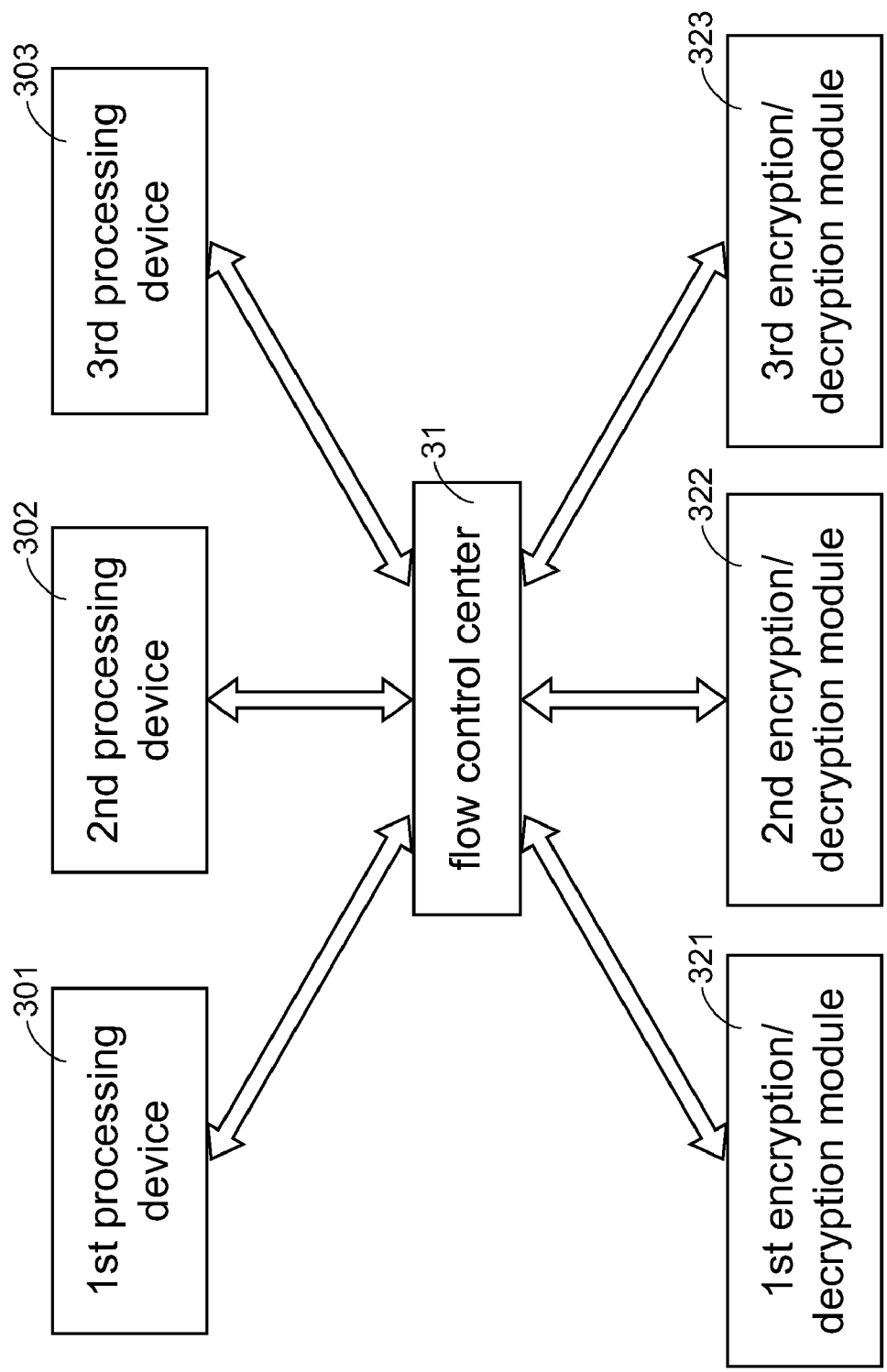
FIG. 3 is a scheme showing a data flow in a program tool for encryption/decryption according to an embodiment of the present invention.

FIG. 3 illustrates a concept of the present invention with reference to the example of FIG. 2. A first processing device 301, a second processing device 302 and a third processing device 303 are circuit modules included in the program tool for performing the first processing step 21, the second processing step 22 and the third processing step 23. The program tool according to the present invention further includes a flow control center 31 and first, second and third encryption/decryption modules 321, 322 and 323. The first output data 211 outputted by the first processing device 301 is first sent by the flow control center 31 to the first encryption/decryption module 321 to be encrypted and temporarily stored as a file accessible by the program-tool user. Afterwards, before the first output data 211 is inputted to the second processing device 302 to be processed, the flow control center 31 sends the first output data 211 and/or the second input data 220 which is encoded by the same rule as the first output data 211 to the first encryption/decryption module 321 to be decrypted. The decrypted first output data 211 and/or second input data 220 are then inputted into the second processing device 302 to generate the second output data 221. Likewise, via the flow control center 31, the second output data 221 are encrypted for storing and then decrypted for processing by the second encryption/decryption module 322 so as to hide a secured portion of the output data from being accessible by the program-tool user. In the third processing step 23, the third input data 230 may also be inputted into the third processing device 303 independently or along with the second output data 221, wherein the third input data 230 is encoded by the same rule as the second output signal 221 and recovered by the second encryption/decryption module 322 before being processed by the third processing device 303. The third output data 231 outputted by the third processing device 303 is also sent to the third encryption/decryption module 323 by the flow control center 31 to be encrypted. The encrypted data is stored as an accessible file in which some data are visible while the others are hidden. Afterwards, when necessary, the data can be decrypted and recovered for further use. In this way, all the intermediate and final output data can be secured from arbitrary accessing or revision.

Figure 4:
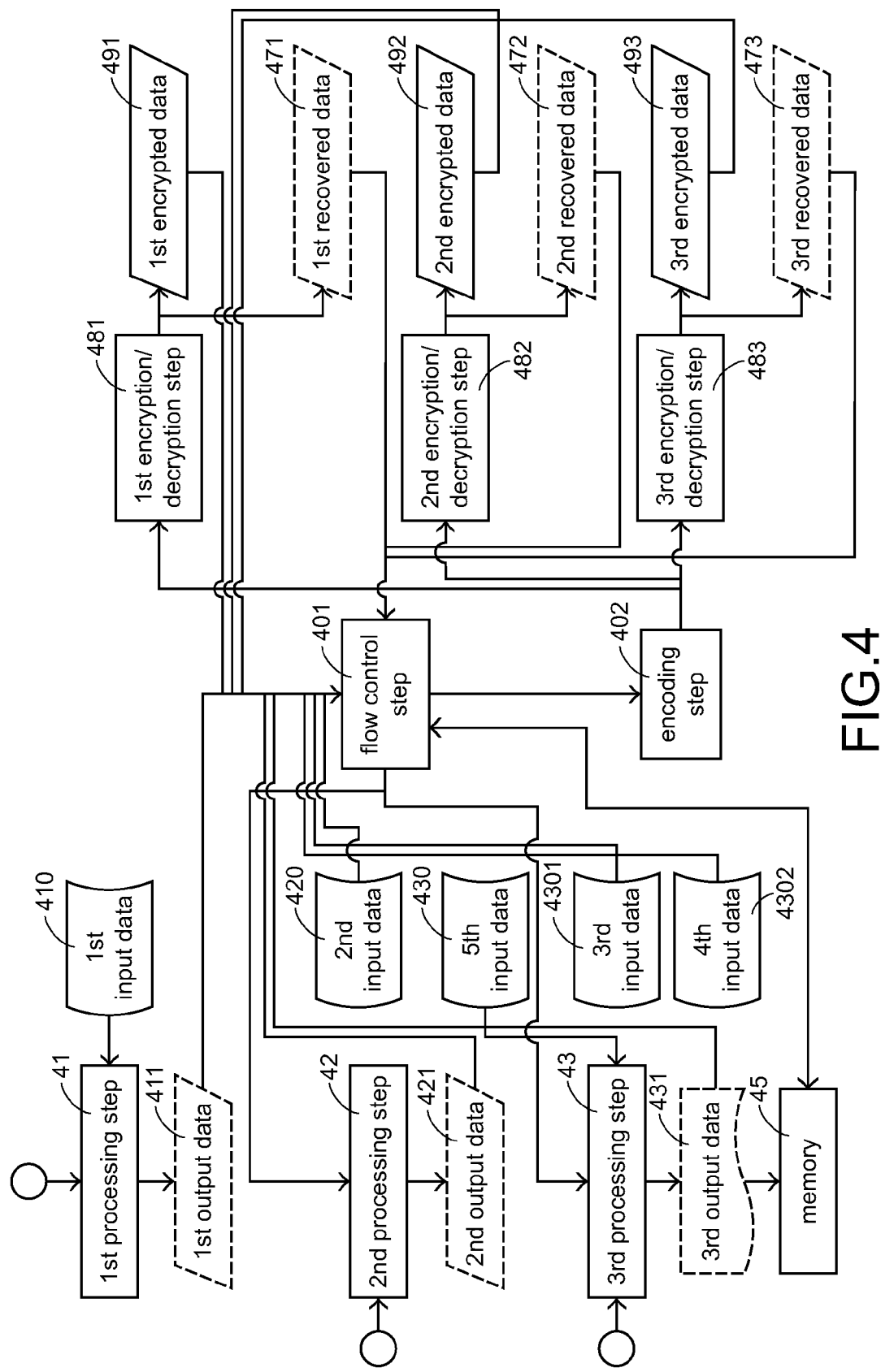
FIG. 4 is a scheme exemplifying a program tool according to an embodiment of the present invention.

In the above embodiment, the second input data 220 and the third input data 230 are previously encoded with the same rules as the first output data 211 and the second output data 221, respectively, and thus required to be decrypted before entering the second processing device 302 and the third processing device 303 to be processed. Alternatively, the input data can be directly inputted into the processing device without previous encoding and thus no decryption for the input data is required. On the other hand, more than one kind of input data may be inputted into the processing device to be processed at the same time. FIG. 4 illustrates data flows of an exemplified program tool according to the present invention, which involves both encrypted and non-encrypted input data and multiple input data.

In a first processing step 41, a first input data 410 is processed into a first output data 411. The first output data 411, through a flow control step 401, an encoding step 402 and a first encryption/decryption step 481, is converted to a first encrypted output data 491 and a first recovered data 471, wherein the former is stored for subsequent use and accessible by the program-tool user (solid line) while the latter is obtained for next processing step and inaccessible by the program-tool user (dashed line). Since the first output data 491 has been encrypted, it is feasible to secure specific data from arbitrary accessing and revision by the program-tool user while allowing the program-tool user to check and revise some of the data.

In a second processing step 42, the recovered first output data 471 and/or a second input data 420, which is encoded with the same rule as the first output data 491 and then decrypted via the flow control step 401, encoding step 402 and first encryption/decryption step 481, are processed to output a second output data 421. The second output data 421, through the flow control step 401, the encoding step 402 and a second encryption/decryption step 482, is converted to a second encrypted output data 492 and a second recovered data 472, wherein the former is stored for subsequent use and accessible by the program-tool user while the latter is obtained for next processing step and inaccessible by the program-tool user.

In a third processing step 43, the recovered second output data 472 and/or third and fourth input data 4301 and 4302, which are encoded with the same rule as the second output data 492 and then decrypted via the flow control step 401, encoding step 402 and second encryption/decryption step 482, are processed to output a third output data 431, which are final program codes. The third output data 431 is further encrypted through the flow control step 401, the encoding step 402 and a third encryption/decryption step 483 before being stored into a memory 45 such as a flash memory or other nonvolatile memories. Alternatively, a fifth input data without being encoded and decoded can be inputted in the third processing step 43 to be processed independently or along with the data 472, 4301 and/or 4302.

In the above embodiments, three processing stages of a program tool are exemplified. It is understood that the stage number can be expanded according to practical uses.

Since the intermediate output data are encrypted for storing and the decrypted for processing, the processing steps can be performed normally while the intermediate output data can be secured from arbitrary accessing and revision. The encryption function is preferably performed in a manner that specific data can be secured from arbitrary accessing and revision by the program-tool user while allowing the program-tool user to check and revise other parts of the data.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data-securing method for use in a program tool used for modifying a SOC of an electric product, comprising steps of:
    a) performing a first processing step with a first input data by a first processing device of the program tool to generate a first output data;
    b) transferring the first output data by a flow control center to perform an encryption step of the first output data by an encryption/decryption module of the program tool to generate an encrypted first intermediate output data, the encrypted first intermediate output data being accessible by a program-tool user;
    c) transferring the encrypted first intermediate output data by the flow control center to perform a decryption step of the encrypted first intermediate output data by the encryption/decryption module of the program tool to recover the first output data, the recovered first output data being inaccessible by the program-tool user; and
    d) performing a second processing step with the recovered first output data by a second processing device of the program tool to generate a second output data.

2. The method according to claim 1 wherein the second processing step is performed with the recovered first output data and a second input data to generate the second output data.

3. The method according to claim 2 wherein the second input data is encoded by the same rule as the encrypted first intermediate output data.

4. The method according to claim 3 further comprising a step of transferring the first input data by the flow control center to perform a decryption step of the first input data before the second processing step is performed.

5. The method according to claim 1 wherein the steps a)~d) are repeated by using the second output data as the first input data.

6. The method according to claim 5 wherein the steps a)~d) are repeated by a number of times until a final output data is obtained.

7. The method according to claim 6 wherein the final output data is transferred by the flow control center to perform an encryption step and then stored into a memory.

8. The method according to claim 1 for use in a program tool for developing a control chip.

9. A data-securing method for use in a program tool used for modifying a SOC of an electric product, comprising steps of:
 performing a first processing step with a first input data by a first processing device of the program tool to generate a first output data;
 transferring the first output data by a flow control center to perform an encryption step of the first output data by an encryption/decryption module of the program tool to generate an encrypted first intermediate output data, the encrypted first intermediate output data being accessible by a program-tool user;
 storing the encrypted first intermediate output data;
 transferring the stored encrypted first output data by the flow control center to perform a decryption step of the encrypted first intermediate output data by the encryption/decryption module of the program tool when the first output data is to be used as an input data of a second processing step, thereby recovering the first output data, the recovered first output data being inaccessible by the program-tool user; and
 performing the second processing step with the recovered first output data by a second processing device of the program tool to generate a second output data.

10. A program tool with a data-securing function, the program tool being used for modifying a SOC of an electric product, and the program tool comprising a flow control center, a plurality of processing units for performing respective processing steps of data to generate intermediate output data to be accessible by a program-tool user, and at least one encryption/decryption module for performing an encrypting/decrypting step of a data processed by one of the plurality of processing units before the processed data is accessible by the program-tool user, wherein the flow control center receives and transfers an encrypted input data to perform a decryption step, transfers the decrypted data to a subsequent one of the plurality of processing units to perform a corresponding processing step, and optionally, further transfers the processed data to perform another encryption step.

11. The method according to claim 1 wherein the program-tool user is able to check or edit program codes of the program tool by means of checking or editing the first intermediate output data.

12. The method according to claim 9 wherein the program-tool user is able to check or edit program codes of the program tool by means of checking or editing the encrypted first intermediate output data.

13. The program tool according to claim 10 wherein the program-tool user is able to check or edit program codes of the program tool by means of checking or editing the intermediate output data.

* * * * *